Jan. 30, 1945.  H. DANNENBAUM  2,368,204
CARBOXYLIC ACIDS OF CYCLOPENTANO-POLYHYDROPHENANTHRENE
SERIES AND PROCESS FOR PRODUCING THE SAME
Filed July 6, 1938
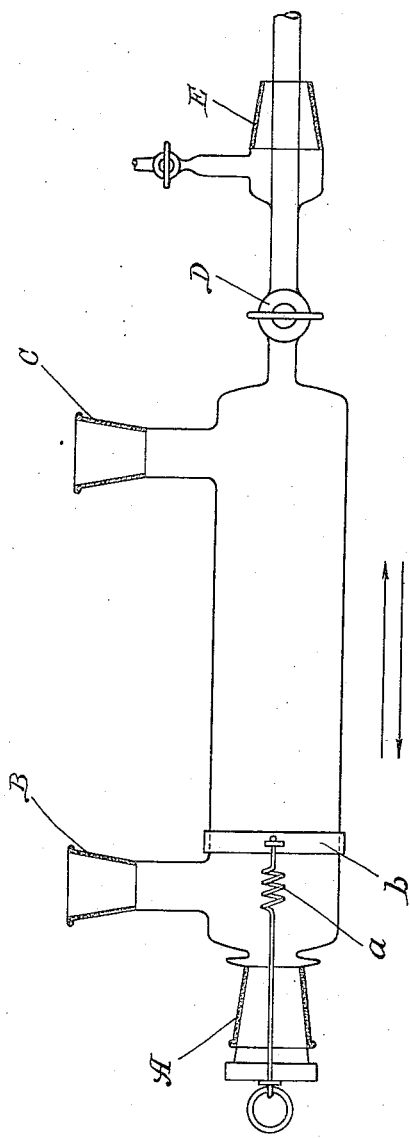
WITNESS
G. V. Rasmussen
INVENTOR
HANS DANNENBAUM
BY
Briesen & Schrenk,
ATTORNEYS Patented Jan. 30, 1945

2,368,204

UNITED STATES PATENT OFFICE 2,368,204

CARBOXYLIC ACIDS OF CYCLOPENTANO-POLYHYDROPHENANTHRENE SERIES AND PROCESS FOR PRODUCING THE SAME

Hans Dannenbaum, Falkenhain - Finkenkrug, near Berlin, Germany, assignor to Schering Corporation, Bloomfield, N. J., a corporation of New Jersey Application July 6, 1938, Serial No. 217,656
In Germany July 7, 1937

18 Claims. (Cl. 260—397.1)

This invention relates to organo-metallic compounds and a process and apparatus for carrying out organo-metallic reactions in the cyclopentano-polyhydrophenanthrene series and in particular for the manufacture of carboxylic acids of this series.

For the manufacture of Grignard solutions in most cases magnesium is employed. Cases are known, however, in which magnesium organic compounds either do not form or form only with difficulty or only react difficultly or in an undesired manner with further additions.

It has been shown that it is only possible with difficulty to prepare Grignard solutions from halides which belong to the cyclopentano-polyhydrophenanthrene series if in the customary manner magnesium is employed and that the produced Grignard compounds containing magnesium are little suited for further reactions since they are only capable of reacting sluggishly.

In accordance with the present invention it is possible in a more convenient and technically simpler manner to prepare metal organic compounds of halogenated cyclopentano-polyhydrophenanthrene derivatives when as metals the alkali metals, as for example sodium or potassium and in particular lithium are employed.

The compounds produced in this manner and in particular the lithium compounds are an improvement over Grignard compounds of the magnesium halide type and are capable of reacting easily and almost quantitatively with further additions so that in this case the possibility exists of employing such compounds to a considerable extent for the synthesis of numerous other compounds.

The following scheme is intended to illustrate the reaction:

I. X—Hlg+2Me=MeHlg+Me—X
II. Me—X+YR=MeY+X—R

In the above, X indicates a residue belonging to the cyclopentano-polyhydro-phenanthrene series, Hlg halogen, Me an alkali metal and in particular lithium, YR a compound to be reacted with the organo-metallic reaction product, which compound does not react in essential manner with alkali metal, as for example esters, nitriles, oxo compounds and others, as are described for example in Houben Weyl, "Die Methoden der organischen Chemie," 1923, vol. 3, page 61 et seq. and 674 et seq. and the literature references there mentioned in the footnotes, and XR indicates the synthetically produced cyclopentano-polyhydrophenanthrene compound.

The reaction can be carried out in the manner known per se, for instance, the alkali metals are caused to react on the halides in an inert medium, for example in hydrocarbons such as benzene or ethers such as ethyl ether.

It has also proved very advantageous to employ as reaction medium liquid ammonia. In this case the working up of large batches is possible.

For carrying out the reaction it is to be recommended to employ the metals in fine distribution which is possible particularly for example in the apparatus described below. It is also suitable to work in an inert atmosphere, for example in a hydrogen atmosphere.

It is known that reactions the components of which exist in different phases (for example solid and liquid bodies, non-miscible liquids and others) are greatly reduced in velocity, or it may occur that reactions which of themselves take place fairly smoothly, in heterogeneous systems are restrained or completely prevented by reason of the reaction products forming incrustations or new impermeable surface layers which frequently need only be very thin to bring the reaction completely to a standstill. This danger is especially great in working with alkali metals.

The apparatus described below and illustrated in the accompanying drawing allows of the most intimate mixture of components distributed in several phases and continuously produces fresh surfaces while the reaction under the most varied additional conditions can be carried further and to completion.

Referring to the drawing, a horizontally located cylindrical vessel is provided with three ground attachments A, B, C. A is usually closed by a ground stopper, which can be retained by spring tension (a for example secured to a metal ring b); A serves for cleansing or convenient emptying of the cylindrical vessel. B and C render possible either the setting up of different additional apparatus (ground in condensers, dropping funnels, thermometers, stoppers and the like) or the rinsing through with gases. Opposite A at the other end of the cylindrical vessel is fused on a tube provided with cock D and ground in attachment E, which renders it possible in a particularly convenient manner to withdraw and transport the reaction products formed. Through A there can be inserted if necessary a ground in heating tube or rod shaped cooler, traversed by hot or cold water. The apparatus can for example be mounted horizontally on a shaking device, for example a shaking carriage, and can be shaken in the manner shown by arrows.

An essential component of the apparatus is provided by filling bodies located in the interior of the vessel, the nature of which usually depends on the particular case; as particularly suitable have proved, however, glass fragments, such as are obtained by cutting up or smashing glass tubes, i. e. suitably filling bodies somewhat of the form of the known Raschig rings. Of these filling bodies so many are introduced according to the size of the apparatus that about one-third to one-half of the volume of the vessel is filled therewith. The apparatus is then ready for use and can be charged with the reaction mixture. Complete absence of moisture in all parts of the apparatus is essential.

The method of working of the apparatus depends on the fact that, on shaking, the filling bodies are brought into brisk to and fro sliding motion and either, if non-miscible liquids are concerned, thoroughly mix the same or, if one reaction component is solid, by gradual grinding and continuous abrasion of the surface provide for very fine distribution or particularly good surfaces for attack.

It is also possible to cause a very fine disintegration by the action of ultra-sound waves, for instance by heating the alkali metals in an inert solvent having a boiling point above the melting point of the alkali metals so as to melt the same and then exposing the molten alkali metal to the action of sound waves while simultaneously and gradually cooling the mixture.

As starting materials for the reactions there come into consideration the halides, in particular in the form of the chlorine and bromine compounds, of the sterols, bile acids and related substances, such as the saponines, heart poisons, poly-terpenes and their derivatives and also the compounds of sexual hormone character, in particular the substances of the type of the male and female germinal gland hormones such as androsterone, testosterone, oestrone, progesterone or the substances related thereto, for example of the type of the corticosterone and the steroids of the suprarenal cortex and the like related to it.

In carrying out the reaction it is sometimes to be recommended to transform sensitive groups present in the molecules of the starting materials, as for example hydroxyl, keto or amino groups and the like by conversion into such groups as are sufficiently stable towards alkali metals and can further be converted for example by hydrolysis, saponification and the like into the original form.

The halides to be employed as starting materials can be obtained in the manner known per se for example by interaction of suitable compounds of the cyclopentano-polyhydrophenanthrene series with halogens, halogen hydride, sulphur or phosphorus halides, for example according to the process of the British Specification Nr. 451,509; the halides can, however, also be produced by addition of halogen or halogen hydride to reactive multiple bonds in the ring system. By suitable selection of the starting materials it is possible to obtain halides in the case of which the halogen is located at any suitable position in the molecule. Particularly important are, however, such compounds in the case of which the halogen is present in 3- or 17-position.

The process according to the invention is of particular important since alkali metal and in particular lithium compounds of the cyclopentano-polyhydrophenanthrene series have hitherto not been produced. In addition, with the aid of the alkali metal compounds of the sterol and sexual hormone series of the type specified, a large number of new, hitherto impossible syntheses of many kinds can be carried out.

For carrying out such syntheses it is obviously not necessary and not advisable to separate the alkali metal compound as such but it can immediately in statu nascendi be further worked up to the desired compound in such a manner that the substances to be reacted with the alkali metal compound are added to the reaction solution at the beginning.

The reaction of the present invention is of particular interest in the cyclopentano-polyhydrophenanthrene series for the introduction of carboxyl groups. Also in this case the halides of the said series, for example of the sterols and bile acids or of the sexual hormone class, in particular the substances of the type of the male and female germinal gland hormones such as androsterone, testosterone, oestrone, progesterone or the substances related thereto, for example of the type of corticosterone and the steroids of the suprarenal cortex and the like related to it, can be converted into metal organic compounds by means of suitable metals as for example alkali metals, especially lithium, which then in the manner known per se by the action of carbonic acid derivatives are converted into carboxylic acids.

For the conversion into the metal organic compounds lithium has provide to be particularly suitable.

The introduction of the carboxyl group takes place in known manner by the action of carbon dioxide, or suitable carbonic acid esters and the like as is described for example in Houben-Weyl, "Die Methoden der organischen Chemie," 1923, vol. 3, page 674.

The reaction may be illustrated in more detail by the following formulae which set out the production of 3-hydroxy-Δ⁵-aetiocholene-17-carboxylic acid from 3-acetoxy-17-chloro-Δ⁵-aetiocholene.

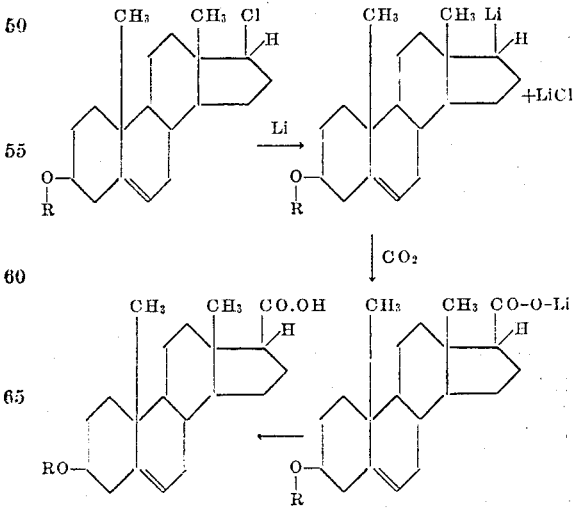

Of particular interest is the introduction of the carboxyl group in 17-position by way of the 17-halogen compounds.

The following examples illustrate the invention:

Example 1

Activation of lithium

When metallic lithium is brought together with freshly distilled dry bromo-styrene in absolute ether the metal immediately becomes coated with a dark brown film, whereupon even on heating no further reaction takes place, for in most cases the metal is so inactivated up to the smallest areas by air ($O_2$, $N_2$) and moisture by a film of oxides, nitrides, hydroxides and so on, that it is no longer attacked. The residual bright metal portions are so changed also by the bromo-styrol that the lithium becomes superficially inactive.

If, however, the lithium is shaken with absolute ether in the above apparatus with the addition of glass fragments, care being taken to preserve a dry hydrogen atmosphere and the bromo-styrene is introduced immediately or later, then the pieces of lithium which are ground silver white from the edges react at once so strongly with the bromide that the attachment of a reflux condenser becomes necessary and the reaction is finished in a very short time. The Li-styryl solution thus produced can either be brought into contact through B or C of the described apparatus with a further Grignard component or C can be provided with a stopper, B with a calcium chloride tube, the apparatus set up vertically and from D the finished solution allowed to pass over into further receptacles attached by means of E.

Example 2

General transformation of sterol halogenides

Sterol halogenides do not react ordinarily with lithium to any useful extent even on heating since the metal again becomes superficially inactive owing to traces of the insoluble steryl lithium compound. However, in the apparatus described above it is possible quite smoothly in the cold and within a few hours to convert several grams of steryl chloride into the corresponding lithium compound, in which case the progress of the reaction can be followed by titration of the very finely powdered suspended lithium chloride.

Example 3

Distribution of salts for Grignard synthesis

In the case of Grignard reactions in some instances the reaction of a metal organic compound with a solid salt is necessary. The application of the apparatus described above renders it possible to grind the insoluble salt very finely in the reaction chamber itself and in this manner to create an extraordinarily large surface.

Example 4

Würtz-Fittig's synthesis in a special-apparatus

In the Würtz-Fittig's synthesis of aromatic compounds the formation of incrustations of alkali metal is strongly disturbing. This difficulty can be readily avoided as follows:

10 grs. ($\alpha$-chloro) ethyl benzene are dissolved in 50 ccs. of anhydrous ether and about 4-5 grs. of sodium in the form of longish, small, right-angled pieces are added. After adding Raschig rings the solution is vigorously shaken. Quite soon the reaction starts and becomes so lively, that it is necessary to place a short cooler of high efficiency on the apparatus so as to keep the ether in the reaction-vessel. The sodium is quickly consumed, forming sludge-like sodium chloride. By this means the formation of incrustations of sodium chloride does not take place because formed crusts are always disintegrated thus keeping the surface of the metal continuously bright. After termination of the reaction the content is rinsed out, the rest of the metal partly removed, partly destroyed by addition of little alcohol and the washed ether evaporated. The remaining 2,3-diphenyl-butane is recrystallized from ether. Melting point=126° (small blades). The yield is nearly quantitative.

Example 5

Cholestene by means of lithium 2 grams of cholesteryl chloride are shaken in 50 ccs. of absolute ether with 3 grams of lithium cut up into cubes in a hydrogen atmosphere and in the cold while from time to time a test portion of about 2 ccs. of the solution is withdrawn with a pipette and titrated as regards content of lithium chloride. After three hours the reaction is complete. The solution which has a greyish-white turbidity owing to the suspended lithium chloride and lithium dust, is quantitatively rinsed with ether into a conical flask, the larger lithium residues removed with a glass rod then the lithium dust still present in the solution destroyed with a few drops of alcohol, treated with water and some dilute sulphuric acid, extracted with ether and the dried ether evaporated. There remains an immediately crystallising residue which, recrystallised from acetone is, as regards melting point, rotation and molecular weight determination, identical with cholestene ($C_{27}H_{46}$). The yield is quantitative. The melting point of the compound obtained is 87° C. its optical rotation $\alpha_D = -56°$.

Example 6

Cholesterol carboxylic acid by means of lithium 3 grams of cholesteryl chloride are shaken over night in the cold with 50 ccs. of absolute ether, 3 grams of lithium and 10 ccs. of dry ethyl carbonate; then the reaction is interrupted, decomposition carried out as described above, the whole made strongly acid with sulphuric acid and exhaustively extracted with ether. The ether solution after being thoroughly washed with water is evaporated and the evaporation residue boiled under reflux for one hour with a solution of 5 grams of caustic potash in 100 ccs. of methyl alcohol. Thereupon the whole is rendered weakly acid with glacial acetic acid, considerably concentrated in vacuum, then extracted with ether and the ether, washed with water, exhaustively extracted with small portions of aqueous 2n caustic potash lye. From the ether by means of a chromatographic adsorption analysis still, beautifully crystallized starting material (1.5 grams) can be recovered while from the lye by acidification and extraction with ether 1.3 grams of a mixture of the two cholesterol carboxylic acid epimeric on the carbon atom 3 can be produced which melt unsharply at 150-160° C. and at 210-220° C.; it forms an insoluble Ba salt and reddens moist litmus paper slightly. The reaction can with longer duration and under corresponding conditions be rendered entirely quantitative.

Example 7

Cholestene by means of sodium 2 grams of cholesteryl chloride are dissolved in 50 ccs. of absolute ether and shaken in a hydrogen atmosphere with a few pieces of sodium and about 50 glass Raschig rings. The liquid becomes rapidly turbid; periodically withdrawn test portions titrated for chlorine ions indicate that even after only an hour the reaction is complete. By decomposition of the decanted ethereal suspension with a few drops of alcohol and washing of the ether with dilute acid and water, together with subsequent drying and evaporation of the ether, there is obtained in practically quantitative yield crude cholestene which after one recrystallisation from ether-methanol exhibits the melting point 89° C. and gives no depression on mixed melting point determination with a preparation produced from cholesteryl chloride and lithium.

EXAMPLE 8

Cholesterol carboxylic acid by means of sodium 2 grams of cholesteryl chloride are treated with 50 ccs. of absolute ether and 10 ccs. diethyl carbonate, and as described in the previous examples, shaken briskly with glass Raschig rings and a few cubes of sodium. Even after 4 hours a considerable liberation of halogen from the cholesteryl chloride can be analytically established. The process is then interrupted, the ethereal suspension decomposed, washed with dilute sulphuric acid and subsequently with water and dried over sodium sulphate. The beautiful crystalline residue which is obtained after evaporation is freed by heating in vacuum as far as possible from residual carbonic acid ester and subsequently saponified by 1 hour's heating with 5% methanolic caustic potash lye. The saponification product is taken up in ether and the acids formed separated by extraction by shaking with caustic lye, isolated from the solution thus obtained by acidification and extracted with ether and recovered by evaporation of the purified ether extract. It constitutes a beautifully crystallising substance difficultly soluble in acetone. The yield amounts to about 200 mg.; this can, however, be considerably increased by extension of the reaction period.

EXAMPLE 9

Carboxy androstenone by means of lithium 1 gram of dehydroandrosterone is introduced into a mixture of 10 ccs. of chloroform and 1 gram of phosphorus pentachloride; after 1½ hours standing at room temperature the whole is decomposed with ice water, extracted with ether and the ether solution washed with bicarbonate and water, dried and evaporated. The residue yields on recrystallization from dilute acetone 860 mg. of 3-chloro-$\Delta^5$-androsten-17-one. M. P. 154–156° C. The substance thus produced is shaken with 60 ccs. of ether and 12 ccs. of diethyl carbonate, which have both been carefully purified from moisture and by-products by distillation over sodium, in a shaking apparatus as described in the preceding examples with glass rings and lithium fragments an indifferent hydrogen atmosphere being provided. After shaking over night in the cold, the whole is worked up in such a manner that the ethereal suspension is freed mechanically from larger lithium residues, decomposed with some alcohol, washed with 2n sulphuric acid and then with water, dried and evaporated. After 1 hour's saponification of the residue with 100 ccs. of 3% methanolic caustic potash lye and subsequent distribution, as described in the preceding examples, there is obtained the 3-carboxy-$\Delta^5$-androsten-17-one, which is obtained in the form of a mixture melting unsharply at 120–210° C. of the two forms epimeric on the carbon atom 3 in a yield of almost 44 mg.

EXAMPLE 10

Carboxyandrostanone by means of lithium

From the 3-chloro-$\Delta^5$-androsten-17-one produced according to Example 9, there is produced by hydrogenation with hydrogen and palladium the saturated 3-chloro-androstan-17-one (M. P. 173° C.). This substance can also in the same manner as set forth in Example 9 be converted by way of the lithium compound into its 3-carboxy-derivative; in a yield of about 45% there is produced an epimeric mixture of unsharp melting point 150–250° C. which contains the 3-carboxy-androstan-17-one.

EXAMPLE 11

Cholestene by means of potassium 2 grams of cholesteryl chloride are dissolved in 50 ccs. of benzene and with the exclusion of moisture shaken in a hydrogen atmosphere with about 3 grams of potassium metal cut up into pieces at ordinary temperature. In the course of several hours the solution becomes deep malachite green colored and deposits oily deep green colored flakes. After about 10 hours shaking the product is separated from unreacted metal, decomposed with benzene containing alcohol and the benzene solution washed with water whereby a completely colorless solution results. In the water large quantities of chlorine ions corresponding to the proportions of materials used can be detected; from the benzene there crystallises after evaporation and grinding with methanol, a completely colorless compound of M. P. 88–89° C., which according to mixed melting point, optical rotation ($\alpha_D = -57°$), molecular weight determination and analysis is identical with cholesene, $C_{27}H_{46}$, and completely free from chlorine. Yield quantitative. Coupling of two nuclei in the sense of a Würtz reaction has thus not taken place to a detectable extent.

EXAMPLE 12

Cholesterol carboxylic acid by means of potassium 2 grams of cholesteryl chloride are brought into reaction with shaking in 50 ccs. of absolute ether with several pieces of potassium metal of the size of a pea in a carbon dioxide atmosphere. After about 15 hours reaction duration the greater part of the cholesteryl chloride has reacted; the content of the reaction vessel is decomposed in known manner and the reaction products resolved into neutral and acid constituents. The carboxylic acids produced, which form very difficultly soluble alkali salts, can be recrystallised well from acetone and exhibit a melting point above 220° C. Together with much potassium chloride, which is produced in practically theoretical quantity, there can be isolated as by-product tricholesteryl carbinol $(C_{27}H_{45})_3.C.OH$ (M. P. 190° C.), which has been produced from the originally formed cholesterol carboxylic acid by further reaction with potassium cholesteryl. The yield of acids reduced by this secondary reaction amounts to about 210 mg. of crude product.

EXAMPLE 13

Cholesterol carboxylic acid by means of potassium 2 grams of cholesteryl chloride are brought into reaction with potassium metal and carbon dioxide as described in Example 12 but in 50 ccs. of absolute benzene; after 7 hours reaction duration about ⅓ of the cholesteryl chloride has been consumed. The reaction products can again be separated into starting material, tricholesteryl carbinol and cholesterol carboxylic acid (M. P. 220° C.); the yield of acid amounts to about 80 mg.

EXAMPLE 14

Hydroxy aetiocholen-carboxylic acid by means of sodium 1 gram of 17-chloro-3-acetoxy-$\Delta^5$-androstene is shaken for 2 hours in absolute ether with excess of sodium metal in the form of cubes and 40 grams of purest di-isoamyl carbonate. After removal of coarse sodium residues the product is decomposed with alcohol with cooling, the solvent evaporated by steam distillation in vacuum and the residue saponified by four hours boiling with alcoholic 10% caustic potash. By treating with glacial acetic acid it is neutralised (phenolphthalein), then the reaction solution is concentrated in vacuum, acidified and exhaustively extracted with ether. From the ether the 3-hydroxy-$\Delta^5$-aetiocholen-17-carboxylic acid formed can be separated as difficultly soluble sodium salt by means of caustic soda lye and after decomposition thereof with acid isolated and purified by recrystallisation from acetone-water. The yield amounts to about 180 mg. The acid possesses a melting point of ca. 280° C.

EXAMPLE 15

Cholestene by means of potassium in liquid ammonia

In a three necked flask which is cooled by a mixture of dry ice with ethanol (−80° C.) and is provided with introduction tubes, gas evolution tube and stirring mechanism, about 150-200 ccs. of liquid ammonia (absolutely anhydrous) are prepared. To this are added first with cooling 3-4 grams of solid bright potassium metal, which dissolve with deep blue color, then with stirring a solution of 2 grams of cholesteryl chloride in 30 ccs. of absolute toluene is added within a quarter of an hour drop by drop and the still deep blue solution allowed to stand. After standing over night at −80° C. alcohol-containing ether is added drop by drop with stirring until the blue potassium color has disappeared. The freezing mixture is now removed, the ammonia allowed to vaporise, the product then decomposed with alcohol, water and finally with dilute nitric acid, shaken in a separating funnel and the ether layer separated off. In the aqeuous portion large quantities of chlorine ions can be detected; from the ether there can be isolated in practically quantitative yield cholestene (M. P. 86-88° C.); only small quantities of the starting material can be detected.

Of course, various other modifications in the procedure of the process and the apparatus of the present invention may be resorted to within the scope of the appended claims without departing from the principles set forth herein.

EXAMPLE 16

Carboxylic acids of sterols by means of potassium and ammonia (a) 5 grams of dry bromo-cholestanone are dissolved in 50 ccs. of dry toluene and dropped into 150 ccs. of liquid ammonia, cooled down to −80° C. To this mixture potassium in form of small pieces is added until a constant blue coloring is obtained. After allowing the reaction mixture to stand for some time the ammonia is evaporated by removing the cooling bath and then dry carbon dioxide gas is passed into the remaining solution of toluene, the solution being protected against atmospheric humidity and at the same time alcohol is dropped into the solution in order to destroy the remaining potassium. On working up the reaction mixture, very well crystallized, carboxylic acids—besides cholestanone (which latter is formed by exchange of the combined potassium with hydrogen)—are obtained in relatively large quantities, said carboxylic acids being formed by replacement of the intermediarily combined potassium with the carboxylic group.

(b) 2 grams of cholesteryl chloride are dissolved in 50 ccs. of toluene. To this mixture, protected against moisture, potassium metal is added whereupon it is saturated with ammonia while cooling down to −80° C. until the beginning of a dark-blue coloring shows a sufficient liquefaction of the gas. By further addition of metal the coloring is maintained during 4 hours, thereafter the ammonia is quantitatively evaporated in a dry nitrogen current by removing the cooling bath. At a temperature of −20° C. dry carbon dioxide gas is passed into the solution during one hour while stirring vigorously. On working up the reaction mixture in the usual way, about 100 mgrams of crude cholesterol carboxylic acid are obtained besides much cholestene and some cholesteryl chloride, i. e. the starting-material.

What I claim is:

1. A process for the manufacture of compounds of the cyclopentano polyhydro phenanthrene series, comprising subjecting a halogenide of a cyclopentano polyhydro phenanthrene compound to the action of an alkali metal in an inert medium until the halogen of the compound is replaced to a substantial extent by the alkali metal to form the alkali metal derivative of the cyclopentanopolyhydro phenanthrene compound, and subjecting the resulting alkali metal derivative of the compound of the cyclopentano polyhydro phenanthrene series to the action of a substance capable of reacting with a Grignard reagent.

2. Unsaturated 3-carboxy-androstan-17-ones and their salts.

3. A process for the manufacture of compounds of the cyclopentanopolyhydrophenanthrene series comprising subjecting a halogenide of a cyclophentanopolyhydrophenanthrene compound to the action of an alkali metal in an inert medium and of an organic compound reactive with Grignard reagents, whereby the alkali metal group of the intermediately formed alkali metal derivative of the cyclopentanopolyhydrophenanthrene compound is replaced by an organic group of the organic compound.

4. Process according to claim 3 wherein the reaction is conducted in liquid ammonia.

5. Process according to claim 3 wherein the alkali metal is subjected during the reaction to a rubbing and grinding action in order to expose continually a fresh metallic surface for reaction with the cyclopentanopolyhydrophenanthrene halogenide.

6. Process according to claim 3 in which the alkali metal is lithium.

7. Process according to claim 3 wherein the halogenide compound is that of a sterol.

8. Process according to claim 3 wherein a chloride of a cyclopentanopolyhydrophenanthrene compound is employed.

9. A process for the manufacture of compounds of the cyclopentanopolyhydrophenanthrene series comprising subjecting a halogenide of a cyclopentanopolyhydrophenanthrene compound in which the halogen has an atomic weight no higher than that of bromine to the action of an alkali metal and of a compound capable of replacing the alkali metal group of the intermediately formed alkali metal derivative of the cyclopentanopolyhydrophenanthrene compound with a carboxyl group.

10. Process according to claim 9 wherein the reaction product is acidified to produce the free carboxylic acid of the cyclopentanopolyhydrophenanthrene compound.

11. Process according to claim 9 wherein the intermediately formed alkali metal compound is reacted with a carbonic acid compound.

12. A process for the manufacture of compounds of the cyclopentanopolyhydrophenanthrene series comprising subjecting a halogenide of a cyclopentanopolyhydrophenanthrene compound to the action of an alkali metal in an inert medium until the halogen of the compound is replaced by the alkali metal, and thereafter splitting off the alkali metal group.

13. Process according to claim 12 wherein the alkali metal derivative of the cyclopentanopolyhydrophenanthrene compound is reacted with a carbonic acid compound and thereafter acidified.

14. Process according to claim 12 wherein the alkali metal derivative of the cyclopentanopolyhydrophenanthrene compound is treated with water.

15. A process for the manufacture of carboxylic derivatives of the cyclopentanopolyhydrophenanthrene series, comprising reacting a compound of such series having a chlorine group attached to one of the 3 and 17-carbons in an inert medium with an alkali metal and with a carbonic acid ester until the chlorine is replaced by the carboxy group.

16. Process as claimed in claim 9, in which as starting substance 17-halogen compounds of the cyclopentanopolyhydrophenanthrene series are employed.

17. Process as claimed in claim 9, in which as starting substance 3-acyloxy-17-halogen-$\Delta^5$-aetiocholene is employed.

18. 3-carboxy-$\Delta^5$-androsten-17-one of the formula

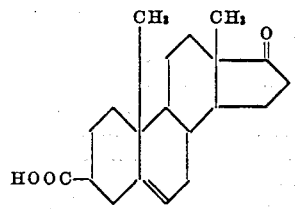

HANS DANNENBAUM.